Aug. 26, 1952  H. H. W. JOHNSON  2,608,260
DRIVEN STEERING WHEELS MOUNTED FOR INDEPENDENT MOVEMENT
Filed Feb. 24, 1948  3 Sheets-Sheet 1

Herman H.W. Johnson
INVENTOR.

BY *Clarence A. O'Brien*
*and Harvey B. Jacobson*
Attorneys

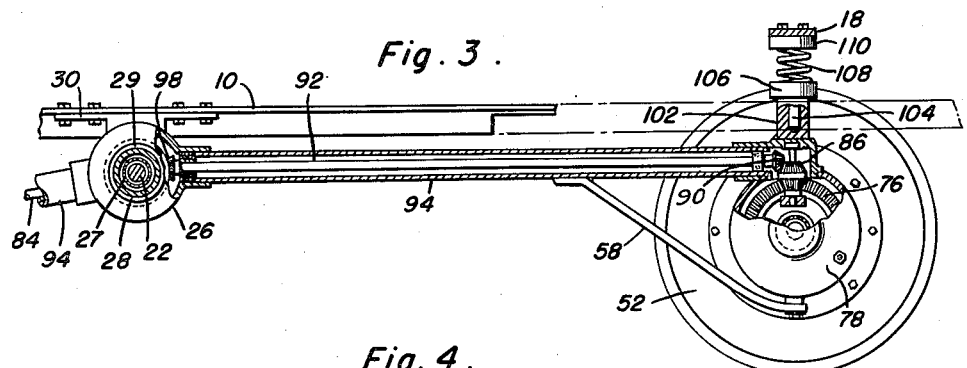
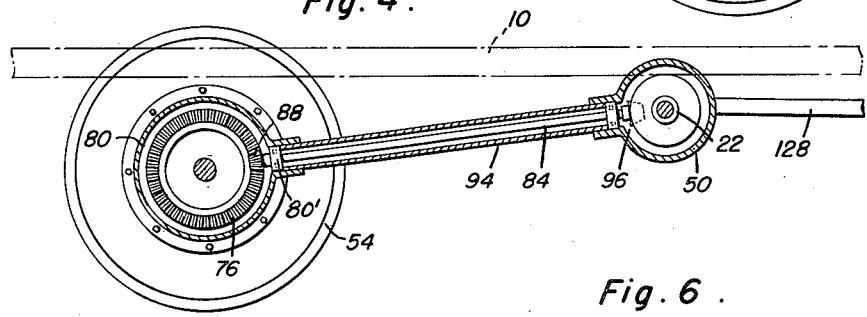
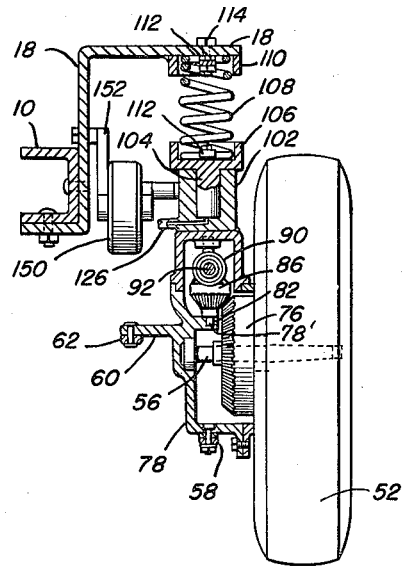
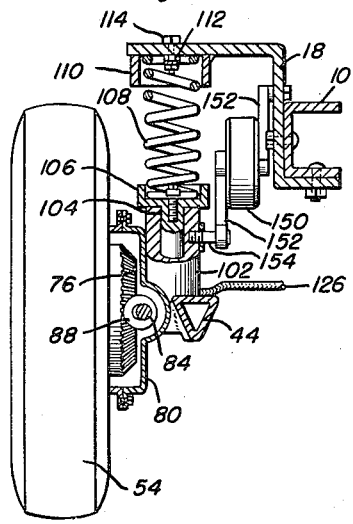

Aug. 26, 1952   H. H. W. JOHNSON   2,608,260
DRIVEN STEERING WHEELS MOUNTED FOR INDEPENDENT MOVEMENT
Filed Feb. 24, 1948   3 Sheets-Sheet 3
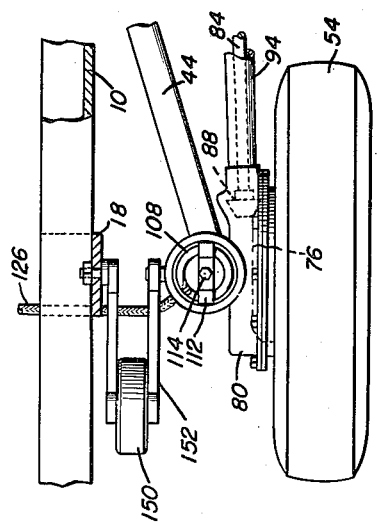
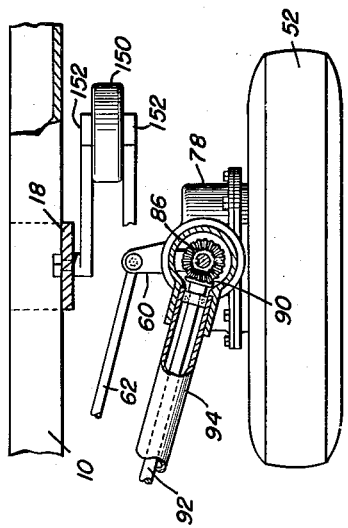
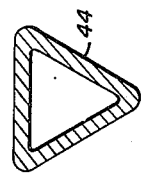
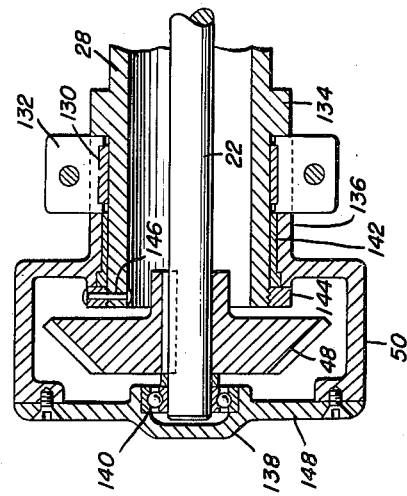
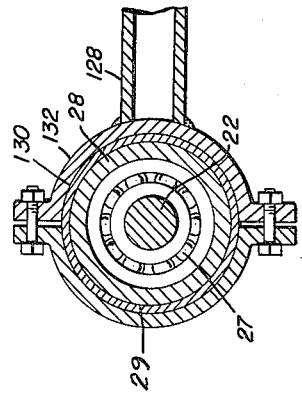
Herman H. W. Johnson
INVENTOR.

Patented Aug. 26, 1952

2,608,260

UNITED STATES PATENT OFFICE 2,608,260

DRIVEN STEERING WHEELS MOUNTED FOR INDEPENDENT MOVEMENT

Herman H. W. Johnson, Akron, Colo.

Application February 24, 1948, Serial No. 10,531

2 Claims. (Cl. 180—44)

This invention relates generally to automotive vehicles, and more particularly to a chassis construction in which four or more wheels are individually resiliently mounted on a rigid frame, all four wheels being driven, with means for raising and lowering the frame relative to the wheels.

A primary object of this invention is to provide a vehicle chassis in which the wheels are individually and resiliently mounted, without the use of universal joints in the power transmission means to these wheels.

Another object of this invention, ancillary to the preceding object, is to avoid the difficulty of maintenance, as well as the increased initial cost, of power transmission means involving the use of universal joints, this invention providing a four-wheel drive suitable for small and large vehicles, and being adaptable for use with an even greater number of driven wheels.

Another object of this invention is to provide means incorporated with a device designed as mentioned above whereby the vehicles may be steered and otherwise controlled satisfactorily.

Still another object of this invention is to provide frame elevating means incorporated with suspension means at each wheel of the vehicle, whereby the frame may be raised relative to the wheels, whenever this is desirable, as in traversing a snow covered road-bed, and in many other instances.

Yet another object of this invention is to provide novel individual wheel mounting means involving the use of specific elements which are themselves novel and utilitarian.

And a last object to be mentioned specifically is to provide a chassis construction which is relatively inexpensive and completely practical to manufacture, which is safe, simple and convenient to use, and which will give generally efficient and durable service.

With these objects definitely in view, together with other objects of a specific character which will become apparent as this description proceeds, this invention resides in certain novel features of construction, combination and arrangement of elements and portions which will be hereinafter described in the specification, particularly pointed out in the appended claims, and illustrated in the accompanying drawings which form a material part of this application, and in which:

Figure 3 is a vertical longitudinal sectional view of a portion of the chassis, taken on the irregular section line 3—3 of Figure 1;

Figure 4 is a similar vertical longitudinal sectional view, taken on the irregular section line 4—4 in Figure 1, and illustrating a rear portion of the chassis;

Figure 5 is a vertical transverse sectional view of a wheel and wheel mounting, taken on the line 5—5 in Figure 1;

Figure 6 is a similar view, taken on the line 6—6 in Figure 1 and showing the front wheel mounting in vertical section;

Figure 7 and Figure 8 are horizontal sectional views of rear and front wheel mountings, respectively, the wheels being shown in plan and certain portions of the figures being broken away to show the underlying structure in horizontal section;

Figures 9 and 10 and 11 are transverse vertical sectional views taken on the respective section lines in Figure 1 and designed to show portions of the structure used to mount the wheels on the housing assembly disposed substantially centrally and transversely of the chassis.

Similar characters of reference designate similar elements or portions throughout the specification and throughout the several views of the drawings.

Figure 1:
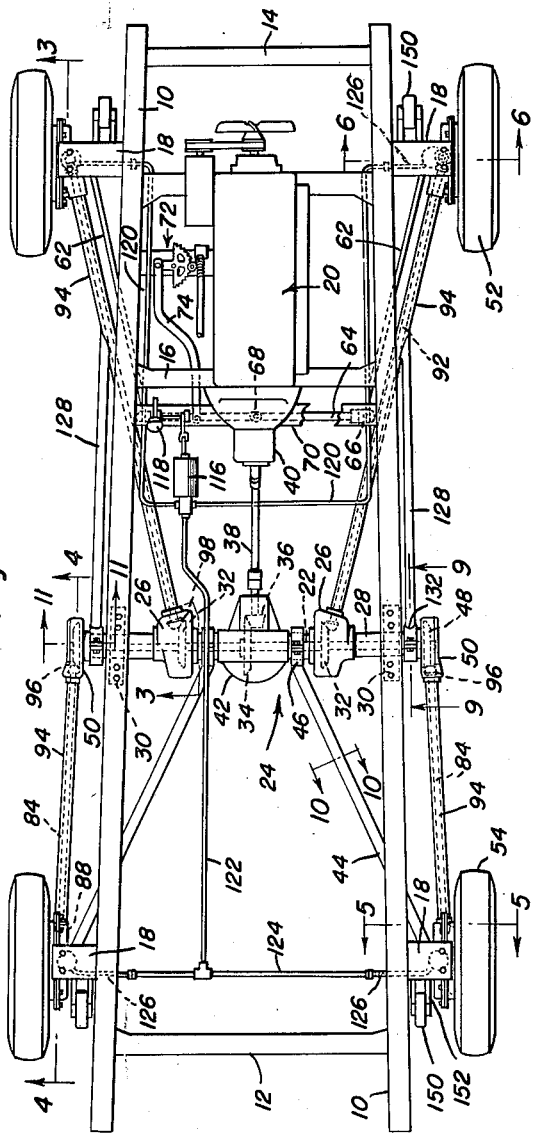
Figure 1 is a top plan view of the improved chassis.
Figure 2:
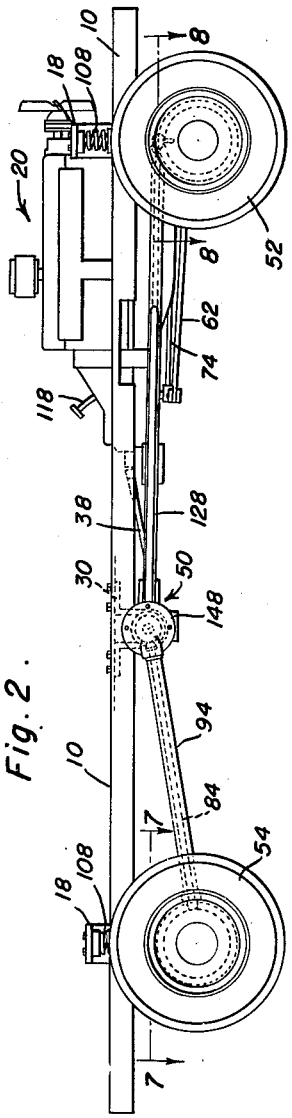
Figure 2 is a right-hand side elevation view of the chassis.

Referring now to the drawings in detail, this invention will be seen to include a frame having longitudinally disposed side frame members 10, transversely disposed braces 12 and 14, an engine bed 16 and a plurality of outwardly extending portions 18 which may be offset upwardly from the lateral frame members 10, as indicated in the drawings.

An engine 20 will be mounted on the engine bed 16 and a jack shaft 22 will be rotatably mounted transversely of the frame in a housing assembly indicated by the numeral 24. For purposes of reference the enlarged portions of this housing assembly will be referred to as the housings 26 and the reduced portions 28 will be seen to be mounted as at 30 on the lateral frame members 10. The housings 26 have bearings 27 indicated in Figures 3 and 9 between the axle housing 28 and the shaft 22 and a bronze collar bearing 29 is mounted between the housings 28 and the housings 26 to allow rotative movements of the housings 26 with the drive shafts 92 and tubes 94 hereinafter described. The housings 26 each enclose one of the bevelled gears 32 carried by the jack shaft 22, and another bevelled gear 34 which will be driven by a pinion 36 connected to a drive shaft 38 operatively connected with the engine 20 by any suitable means generally indicated at 40 and ordinarily including gear shift and clutch mechanisms, the details of which have no part in this specification. The bevelled gear 34 and pinion 36 will, of course, have their own housing 42, and suitable braces 44 may be provided between lugs 46 on the reduced portions 28 and extending for connection to rearward portions of the lateral frame members 10.

It will be clear from an inspection of the figures, that still other bevelled gears 48 are carried by the jack shaft 22 at the outer ends thereof and these last-mentioned bevelled gears are enclosed in housings 50 mounted for limited rotation on the ends of the reduced portions 28, these housings 50 being located preferably exteriorly of the lateral frame members 10. The front wheels 52 and rear wheels 54 are each mounted for individual vertical movements of the wheels, but special provision is made in the front wheel mountings to allow for steering the front wheels. In the case of the front wheels 52, stub axles 56 terminate in housings hereinafter described which are supported, in part, by pivot ended braces 58 rigidly mounted on the corresponding tubes 94, these housings carry the steering arms 60 which are pivoted to the forward ends of the links 62 while the rear ends of these links are pivotally secured to the tie rod 64 by universal joints 66. The tie rod 64 is pivoted at 68 at any suitable adjacent fixed portion such as a transverse frame brace member 70 and is connected to a conventional steering apparatus 72, including a link 74 and thought to be unnecessary to describe or illustrate in this application.

Both front and rear wheels are provided with bevelled ring gears 76 and these ring gears are caged in housings 78 and 80, the essential features of these housings being that they enclose the ring bevelled gears 76 and also provide bearings 78', 80' for the short shafts 82 and 84 carrying double bevelled gears 86 in the case of the front wheels, these gears being arranged as indicated in Figure 6, and a simple or single bevelled gear 88 carried by the drive shaft 84, in the case of the rear wheels illustrated in Figure 5. In other words, the double bevelled small gear wheel 86 meshes with the ring gear 76 and at the same time is in constant mesh with a pinion 90 carried on the forward end of the drive shaft 92, the forward end of this drive shaft 92 being rotatably supported by a suitable bearing in the housing 78. The drive shafts 84 and 92 may be enclosed by suitable tubes 94, and the said drive shafts extend into the housings 50 and 26, respectively, and have secured thereto pinion gears 96 and 98 whereby the drive shafts are driven continuously when the jack shaft 22 is motivated.

A unique feature of this invention is the incorporation therewith of hydraulic cylinders 102 rigidly secured on the upper portions of each of the housings 78 and 80. Pistons 104 are mounted in these cylinders and each piston has an enlarged head 106 which is recessed to receive the lower end of a spring 108 compressed between the head 106 and a cup member 110 carried by the extending portions 18 of the frame. Diametrically disposed straps 112 may be bolted as at 114 to center the springs 108 properly within the cups 110 and the recessed heads 106. A master cylinder 116 having a piston operated by a pedal lever 118 is suitably mounted on the frame and is connected by means of hydraulic tubing 120, 122 and 124 and flexible tubing 126 to each cylinder 102, so that the portions 18 may be forced upwardly, relative to the wheels 52 and 54 by an operator of the vehicle, whenever he may desire to increase the clearance of the frame above the road bed. It will be clear that the springs 108 will cushion the frame at all times and that individual resilient mounting of each wheel is achieved by the structure described above.

Brace members 128 may be connected between the housing 28 and forward portions of the tubes 94 encasing the drive shaft 92, to render stability to this portion of the structure. The forward ends of these brace members 128 may be welded to the tubes 94 and the rear ends are provided with bearing structures including bronze collar bearings 130 and split collars 132 illustrated clearly in Figures 9 and 11. The housing 28 may have annular abutments 134 which coact with inner hub portions 136 of the housings 50, while outer hub portions 138 of the housings 50 may be provided with bearings 140 for the ends of the jack shaft 22. Another bronze bearing collar 142, or equivalent structure, will act as antifriction means between the outer ends of the housing 28 and the hub portions 136, and any suitable structure such as screwed rings 144 held by pins 146 may be used to retain the housings 50 in place and the housings may be formed with removable end plates 148 to facilitate assembly.

Shock absorbers 150 of conventional type will be connected by their arm members 152 to the extending portions 18 of the frame and to suitable portions of the wheel assemblies such as the cylinders 102, the connections being, of course, of pivotal character as illustrated at 154 in Figure 5.

The operation of this invention will be clearly understood from the foregoing description of the mechanical details thereof, taken in connection with the above recitation of the objects sought to be achieved by this invention. In recapitulation, it may be added that a complement of braking mechanisms, steering mechanisms and general control mechanisms of conventional character may be added to this chassis according to the use to which the chassis is to be put and according to individual preferment.

Accordingly this invention should be limited only as determined by a proper interpretation of the terminology used in the subjoined claims.

Having described the invention, what is claimed as new is:

1. In an automotive vehicle chassis including an elongated rigid frame, a drive assembly comprising a jack shaft rotatably mounted on said frame and extending transversely thereof intermediate the ends of said frame, a plurality of axially aligned jack shaft housings rotatably mounted on said jack shaft for movement about the axis of the jack shaft, a plurality of axle housings, each housing having a stub axle journalled therein, a ground contacting wheel mounted on each of said stub axles, a gear casing rotatably mounted on each of said axle housings for rotation about an axis which extends radially of said stub axles, each of said casings being radially spaced from the corresponding stub axle, a shaft tube extending between each of said gear casings and a corresponding one of said jack shaft housings and rigidly secured to the latter, said shaft tubes mounting said axle housings on said jack shaft for vertical movement independently of each other, a brace bar rigidly secured to each of said shaft tubes and extending forwardly therefrom and terminating in spaced vertical relation with the forward end of the corresponding shaft tube, means pivotally attaching each of said axle housings at a point diametrically opposed to said gear casings to a corresponding one of said brace bars for movement about the axis of rotation of the gear casings relative to the axle housing, a bevel gear carried by each of said wheels and disposed in a corresponding one of said axle housings, a drive shaft disposed in each of said tubes and each drive shaft having a bevel gear on opposing ends thereof and respectively disposed in a corresponding one of said gear casings and said jack shaft housings, a double bevel gear rotatably mounted in each of said axle housings and the connected gear casing for movement about the axis of rotation of the gear casings, said double bevel gears drivingly connecting the corresponding drive shaft to the associated bevel gear on said wheels, and means for drivingly connecting said jack shaft to an engine.

2. In an automotive vehicle chassis including an elongated rigid frame, a drive assembly comprising a jack shaft rotatably mounted on said frame and extending transversely thereof intermediate the ends of said frame, a plurality of axially aligned jack shaft housings rotatably mounted on said jack shaft for movement about the axis of the jack shaft, a plurality of axle housings, each housing having a stub axle journalled therein, a ground contacting wheel mounted on each of said stub axles, a gear casing rotatably mounted on each of said axle housings for rotation about an axis which extends radially of said stub axles, each of said casings being radially spaced from the corresponding stub axle, a shaft tube extending between each of said gear casings and a corresponding one of said jack shaft housings and rigidly secured to the latter, said shaft tubes mounting said axle housings on said jack shaft for vertical movement independently of each other, a brace bar rigidly secured to each of said shaft tubes and extending forwardly therefrom and terminating in spaced vertical relation with the forward end of the corresponding shaft tube, means pivotally attaching each of said axle housings at a point diametrically opposed to said gear casings to a corresponding one of said brace bars for movement about the axis of rotation of the gear casings relative to the axle housing, a bevel gear carried by each of said wheels and disposed in a corresponding one of said axle housings, a drive shaft disposed in each of said tubes and each drive shaft having a bevel gear on opposing ends thereof and respectively disposed in a corresponding one of said gear casings and said jack shaft housings, a double bevel gear rotatably mounted in each of said axle housings and the connected gear casing for movement about the axis of rotation of the gear casings, said double bevel gears drivingly connecting the corresponding drive shaft to the associated bevel gear on said wheels, and means for drivingly connecting said jack shaft to an engine, brace members pivotally attached to said jack shaft for movement about the axis thereof, said brace members being rigidly secured to said shaft tubes.

HERMAN H. W. JOHNSON.

REFERENCES CITED

The following references are of record in the file of this patent:

UNITED STATES PATENTS

| Number | Name | Date |
| --- | --- | --- |
| 704,860 | Conaut | July 15, 1902 |
| 1,245,158 | Koshollek | Nov. 6, 1917 |
| 1,283,819 | Lee | Nov. 5, 1918 |
| 1,314,093 | Pifer | Aug. 26, 1919 |
| 1,626,996 | Wood | May 3, 1927 |
| 1,648,753 | Bittner | Nov. 8, 1927 |
| 1,711,881 | Fornaca | May 7, 1929 |
| 1,840,407 | Norman | Jan. 12, 1932 |
| 2,099,114 | Holmes | Nov. 16, 1937 |
| 2,172,362 | Cole | Sept. 12, 1939 |
| 2,199,392 | Dabrasky | May 7, 1940 |
| 2,214,146 | Sagraves | Sept. 10, 1940 |
| 2,224,408 | Peglow | Dec. 19, 1940 |
| 2,257,913 | Maranville | Oct. 7, 1941 |
| 2,279,120 | Hurley | Apr. 7, 1942 |
| 2,299,926 | Phelps | Oct. 27, 1942 |
| 2,375,670 | MacPherson | May 8, 1945 |

FOREIGN PATENTS

| Number | Country | Date |
| --- | --- | --- |
| 281,595 | Great Britain | Mar. 1, 1928 |
| 480,969 | Great Britain | Mar. 3, 1938 |